United States Patent [19]
Houle et al.

[11] Patent Number: 5,211,139
[45] Date of Patent: May 18, 1993

[54] ACTIVE MANIFOLD

[75] Inventors: Dennis E. Houle, Chatham; Stephen E. Brackett, Blenheim; Lisa A. Whaley, Staples, all of Canada

[73] Assignee: Siemens Automotive Limited, Chatham, Canada

[21] Appl. No.: 941,994

[22] Filed: Sep. 8, 1992

[51] Int. Cl.⁵ ............................................. F02M 35/10
[52] U.S. Cl. ........................... 123/52 MB; 123/52 MC
[58] Field of Search .......... 123/52 M, 52 MB, 52 MC, 123/52 MF

[56] References Cited

U.S. PATENT DOCUMENTS

| | | | |
|---|---|---|---|
| 4,590,895 | 5/1986 | Yada et al. | 123/52 MB |
| 4,619,226 | 10/1986 | Ueda et al. | 123/52 MB |
| 4,643,138 | 2/1987 | Ruf et al. | 123/52 M |
| 4,726,329 | 2/1988 | Atkin | 123/52 MB |
| 4,738,233 | 4/1988 | Hitomi et al. | 123/190 A |
| 4,765,286 | 8/1988 | Lyjak et al. | 123/52 MB |
| 4,854,270 | 8/1989 | Melde-Tuczai et al. | 123/52 M |
| 5,056,473 | 10/1991 | Asaki et al. | 123/52 MB |
| 5,092,285 | 3/1992 | Beaber | 123/52 MB |
| 5,105,774 | 4/1992 | Piccini | 123/52 MB |
| 5,143,026 | 9/1992 | Brustle et al. | 123/52 MB |

FOREIGN PATENT DOCUMENTS

| | | | |
|---|---|---|---|
| 0248620 | 10/1990 | Japan | 123/52 MB |
| 2239899 | 7/1991 | United Kingdom | 123/52 MB |

Primary Examiner—David A. Okonsky
Attorney, Agent, or Firm—George L. Boller; Russel C. Wells

[57] ABSTRACT

A shaft-door unit that is operable for selecting the effective lengths of runners leading from a plenum is assembled into the manifold by lengthwise insertion through an opening in an end wall of the plenum that is subsequently closed by a closure member. The shaft-door unit may include as part of the unit, a journal sleeve for journaling the shaft or a tray which incoproates the journal sleeve.

12 Claims, 4 Drawing Sheets

ACTIVE MANIFOLD

FIELD OF THE INVENTION

This invention relates to intake manifolds of internal combustion engines, particularly to an active manifold having selectable length runners from a plenum to the engine's combustion chambers.

BACKGROUND AND SUMMARY OF THE INVENTION

There are a number of patents that disclose intake manifolds having doors that are selectively opened and closed to select the effective lengths of runners from a plenum to individual combustion chambers of an engine. Typically a door is rotatably mounted on the intake manifold and operated by an actuator that is exterior to the plenum. In some manifolds, the door is mounted on a shaft in the manner of a hinge or flap. In others, the shaft is a hollow tube whose wall is selectively apertured so that the doors are thus incorporated into the shaft itself. See U.S. Pat. Nos. 4,643,138; 4,726,329; 4,738,233; 4,854,270 among others for examples of prior manifolds having door-controlled variable length runners.

In general, it is probably not unfair to say that many of the prior manifolds employing doors which are selectively operable to select the effective length of runners from a plenum to engine combustion chambers comprise a substantial number of individual parts that have to be assembled to each other and to the manifold in ways that require a significant number of individual assembly steps. And not all of these steps can be expeditiously performed. Accordingly, there is a need for improvement in such manifolds that makes them more conducive to expeditious fabrication and assembly. It is toward this objective that the present invention is directed.

Briefly, and in a general way, the invention comprises, in one aspect, an intake manifold, and a method of making an intake manifold, wherein a door and a shaft form a unit that is assembled into a manifold by endwise insertion through an opening in an end wall of a plenum, and the plenum is thereafter closed by a closure member that may form a portion of a journal for the shaft.

According to another aspect, the invention comprises the use of an elongated tray to carry the shaft-door unit. The tray, shaft, and door form a sub-assembly that is assembled by insertion lengthwise into the plenum. The tray, in cooperation with clips snapped onto it over the shaft, provides a journal sleeve for the shaft while being suitably slotted to allow the door to swing as the shaft turns in the journal. In the completed manifold, the tray is disposed against the inside wall of the plenum over entrances to the runners and contains a hole pattern shaped for substantial registry with, but slightly larger than, these entrances. The door includes integral perimeter seals for sealing with the margins of these entrances when the door is closed.

According to still another aspect, the invention comprises an elongate journal sleeve that carries the shaft-door unit. The sleeve, shaft, and door form a sub-assembly that is assembled into the plenum. The sleeve has appropriate slotting for the door to pass from its attachment to the shaft through the sleeve's sidewall and to rotate within a limited angular range.

According to yet another aspect, the invention comprises the incorporation of journal sleeve structure into the sidewall of the plenum. The shaft is assembled to the plenum by lengthwise insertion into this journal sleeve structure, and the journal sleeve structure has certain slotting to allow the door to be pre-assembled to the shaft prior to its insertion into the plenum.

Other features, advantages, and benefits of the invention will be seen in the ensuing description and claims which should be considered in conjunction with the accompanying drawings. The drawings disclose a presently preferred embodiment of the invention according to the best mode contemplated at the present time for carrying out the invention.

DESCRIPTION OF A PREFERRED EMBODIMENT

Figure 1:
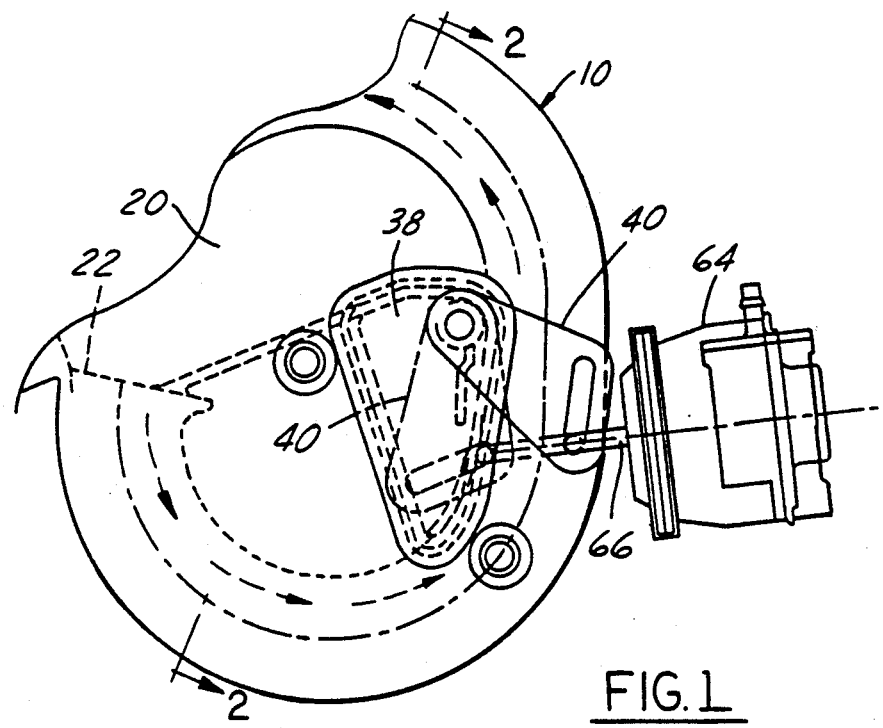
FIG. 1 is a fragmentary end view of an intake manifold embodying principles of the invention.

FIGS. 1–4 present an intake manifold 10 comprising four runners 12a, 12b, 12c, and 12d generally transversely bounding the manifold and extending from a central plenum 14 of the manifold to individual combustion chambers (not shown) of an internal combustion engine. By way of example the runners are generally rectangular in transverse cross section. Plenum 14 is bounded transversely by a sidewall 16 and lengthwise by end walls 18, 20. The plenum is supplied with fresh combustion air via a fresh air inlet (not shown).

Figure 2:
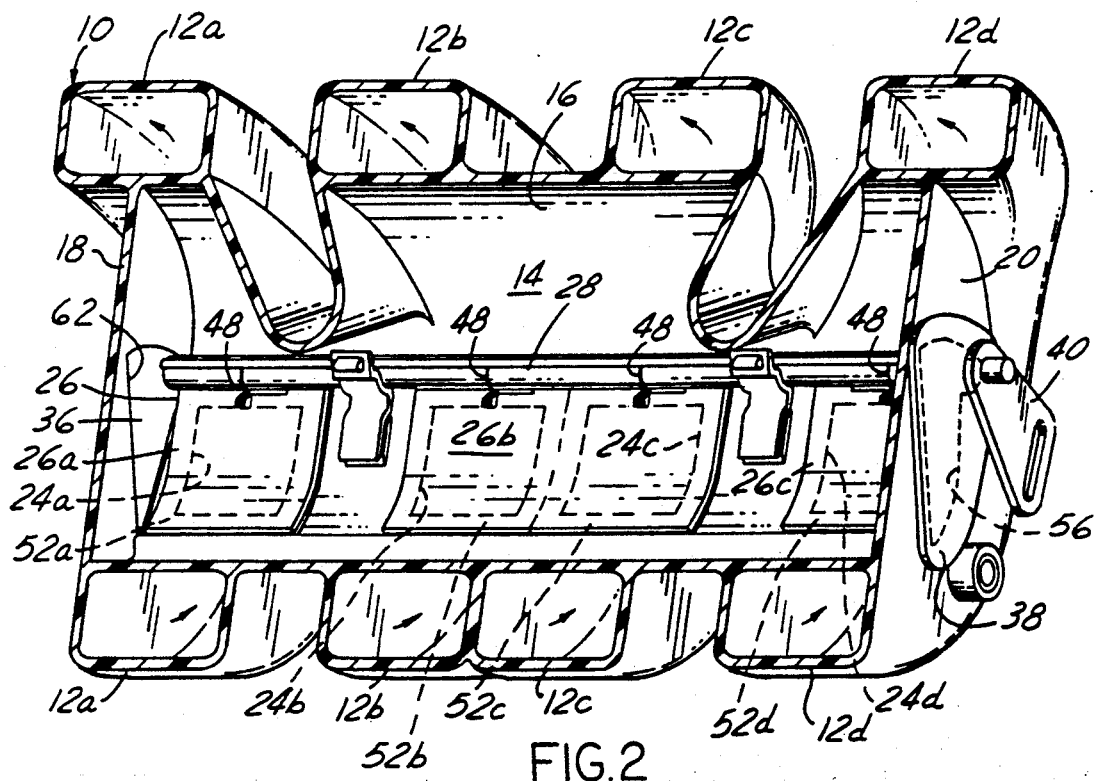
FIG. 2 is a cross sectional perspective view generally in the direction of arrows 2—2 in FIG. 1.

Each runner has a first entrance and a second entrance at plenum 14. The first entrances all lie in a common plane 22 (FIG. 1) while the second entrances 24a, 24b, 24c, and 24d respectively are located downstream from the first entrances. A door 26 comprising three panels 26a, 26b and 26c that are joined to a common operating shaft 28, is shown closing all four second entrances. With door panel 26a closing second entrance 24a, door panel 26b closing second entrances 24b and 24c, and door panel 26c closing second entrance 24d, as shown, only the first entrances are open thus causing each runner to have a "long" effective length. The arrows in FIG. 2 show the flow through the runners when the "long" length is selected. When door 26 is operated to open the second entrances to the plenum, each runner has a "short" effective length since the flow will now enter each runner at the corresponding second entrance 24a, 24b, 24c, 24d which is closer to the combustion chamber than the corresponding first entrance. The selection of "long" or "short" runners is typically determined by engine operating conditions acting through a control to operate shaft 28.

Figure 3:
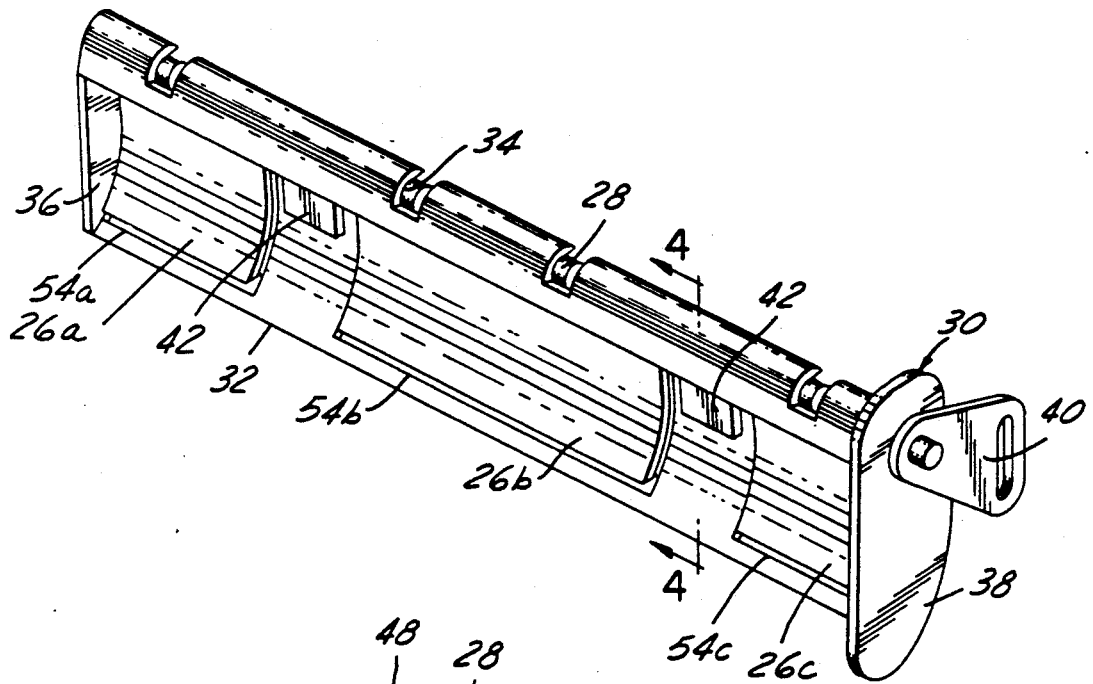
FIG. 3 is a perspective view generally in the same direction as the view of FIG. 2 illustrating a sub-assembly by itself on a slightly larger scale.
Figure 4:
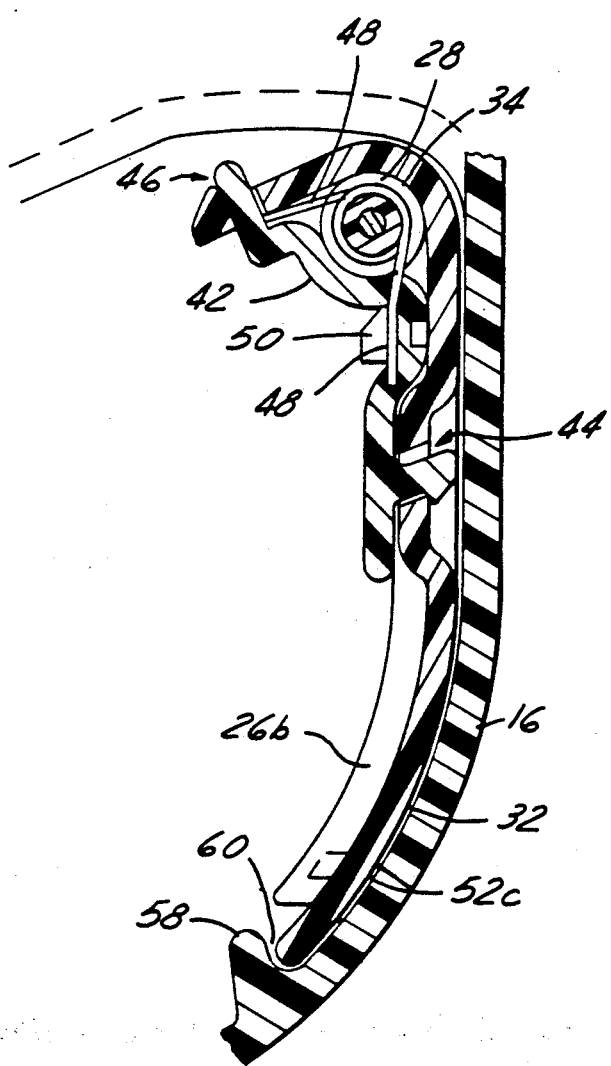
FIG. 4 is an enlarged transverse cross sectional view through the manifold in the direction of arrows 4—4 in FIG. 2.

Shaft 28 is part of a sub-assembly 30 that is shown by itself in FIG. 3, and that further comprises a tray 32 contoured to fit with conformity against the interior of plenum sidewall 16 over that portion of the sidewall which contains second entrances 24a, 24b, 24c, and 24d. The upper lengthwise edge of tray 32 as viewed in the Figs. is curled to form a partially circular crevice 34 forming, in cooperation with two clips, a journal sleeve for shaft 28, and there are closure members 36, 38 at lengthwise opposite ends of the tray. The near closure member 38 in FIG. 3 has a hole that allows for the near end of shaft 28 to pass through to the outside of plenum 14. A crank, or lever, 40 is affixed to the external portion of the shaft for operating it.

Shaft 28 is retained in crevice 34 for journaling by two clips 42 that are spaced apart along the length of the shaft as shown and that have snap-on attachments to tray 32 on opposite sides of the crevice and shaft, at 44 and 46 respectively. Several helical coil springs 48 are disposed around shaft 28 and have respective legs that bear against door 26 and tray 32 so as to resiliently bias the door toward closing the second entrances. The shaft has grooves in which the helical portions of the springs are disposed, and the shaft may be one piece or several pieces assembled together end-to-end. There are four such springs 48, two of which act on panel 26b, and one, on each of panels 26a and 26c. At the location of each spring 48, the panels have two spaced apart risers 50 defining a groove into which the leg of the spring that bears against the door is received.

The door panels are generally rectangular in shape and are contoured for conforming to the contour of the plenum sidewall. Their outer margins overlap the underlying second entrances which they cover. An integral rectangular perimeter seal 52a that is raised toward second entrance 24a is provided around the outer perimeter margin of door panel 26a on the face of the panel that confronts second entrance 24a. Likewise, an integral rectangular perimeter seal 52d that is raised toward second entrance 24d is provided around the outer perimeter margin of door panel 26c on the face of the panel that confronts second entrance 24d. Door panel 26b has two rectangular perimeter seals 52b, 52c on respective halves of the panel for sealing against the margins of second entrances 24b, 24c respectively, but it could just as well have an equivalent larger single seal around the outside of the panel. In order for the door panel seals 52a, 52b, 52c, and 52d to seal against the interior of the plenum sidewall around each second entrance, tray 32 is provided with generally rectangular openings 54a, 54b, and 54c that are slightly larger than those portions of the respective door panels 26a, 26b, and 26c that are to cover the respective second entrances to the runners.

Sub-assembly 30 is assembled into the intake manifold by endwise insertion through a suitably shaped opening 56 in end wall 20. A ridge 58 is provided on the interior of the plenum sidewall to form a groove 60 that extends lengthwise of the plenum and that is open to accept the lower edge of tray 32 as the tray is inserted into the plenum. In other words, the groove provides guidance for the tray to be slid lengthwise into the plenum, and opening 56 is large enough for end closure member 36, the tray and the door to pass through end wall 20. At full insertion of the sub-assembly 30 into the plenum, end closure member 36 is received in and closes an opening 62 in end wall 18 at the same time that end closure member 38 is closing opening 56. The mounting of the sub-assembly is secured in its fully inserted position by the fitting of the end closures to the end wall openings, and/or by joining one or both of them to the corresponding end wall(s), either by a joining process such as welding or adhering and/or by mechanical fasteners. In any event the end walls of the plenum should be closed so that the only airflow into the plenum is via the fresh air inlet. Groove 60 also provides support for the tray on the plenum.

An actuator 64, such as a vacuum motor for example, is mounted externally of the plenum and has a rod 66 that is connected to a slot in lever 40 to complete the installation. The solid line position of FIG. 1 shows the actuator rod retracted, allowing springs 48 to force door 26 closed, thereby selecting the long length for the runners. When the actuator is operated to extend the rod to the extended position shown in broken lines, shaft 28 is turned clockwise some sixty degrees in FIG. 1 about its own axis, thereby opening door 26 to select the "short" length for the runners. The actuator itself is connected to a controller (not shown) that selects the runner length in accordance with engine operation, thus providing an active manifold. This construction represents a hinge-like mounting of the doors where they project radially outwardly from the shaft axis beyond the shaft, rather than a construction wherein the shaft is tubular and the doors are formed in the tube wall by selective slotting of the tube.

Figure 5:
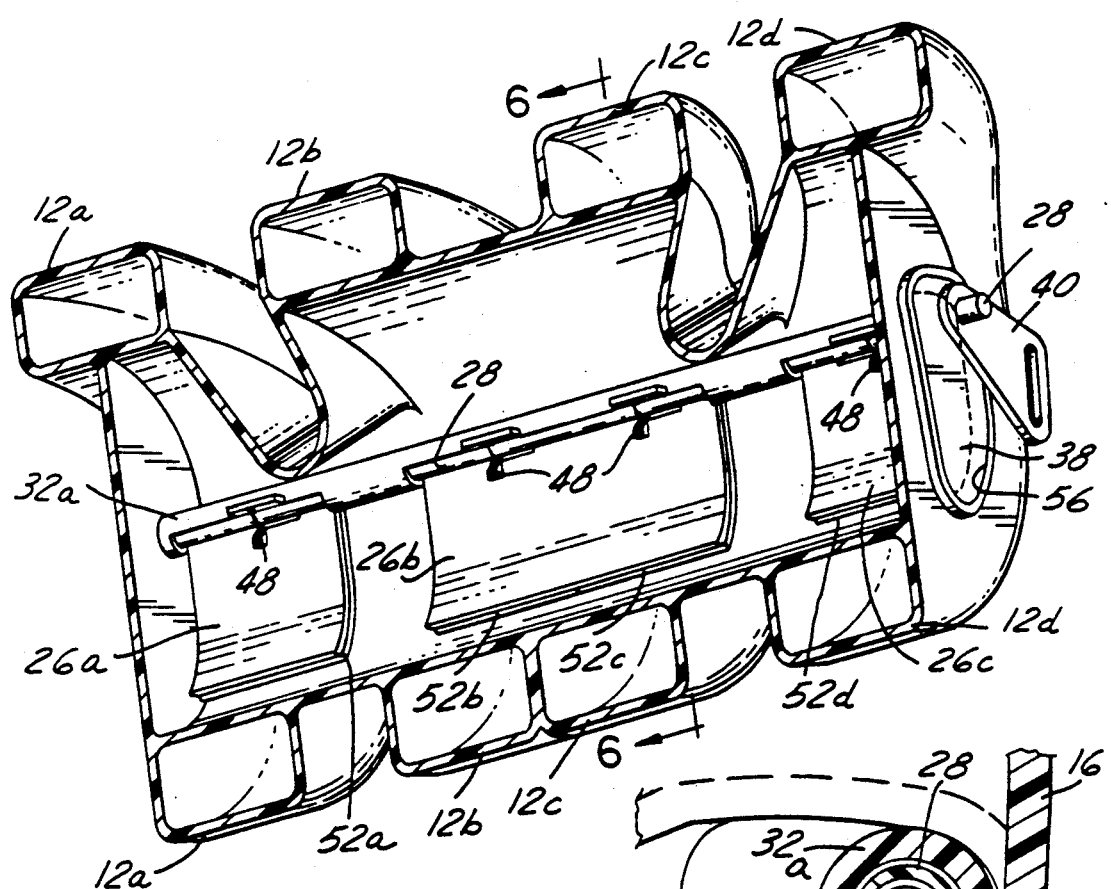
FIG. 5 is a view similar to FIG. 2 illustrating a modified form.
Figure 6:
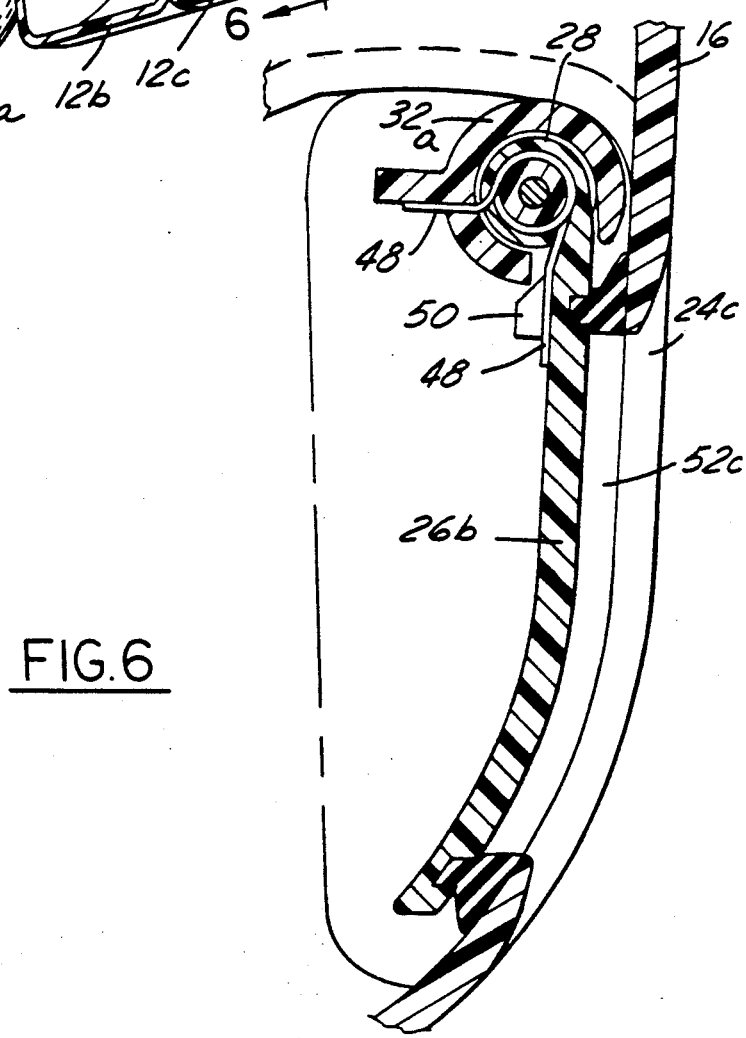
FIG. 6 is an enlarged transverse cross sectional view through the manifold of FIG. 5 in the direction of arrows 6—6.

FIGS. 5 and 6 illustrate an embodiment that is quite similar to the embodiment of FIGS. 1–4, and therefore like reference numerals will be used to identify like parts for both embodiments. The embodiment of FIGS. 5 and 6 differs in that it uses a journal sleeve 32a instead of a tray 32 and clips 42 to carry the shaft-door unit. Journal sleeve 32a, door 26, and shaft 28 still form a sub-assembly that is assembled into the plenum by insertion through opening 56. The journal sleeve has suitable slotting to provide for the rotary motion of the door between closed and open conditions. The journal sleeve does not contain a far end closure member, such as 36 in the FIGS. 1–4 embodiment; rather the end of the journal sleeve is received in a circular hole in end wall 18. The joining of the near end of the journal sleeve to end closure member 38, and the fitting of the latter to opening 56 prevents the journal sleeve from turning once installed.

Figure 7:
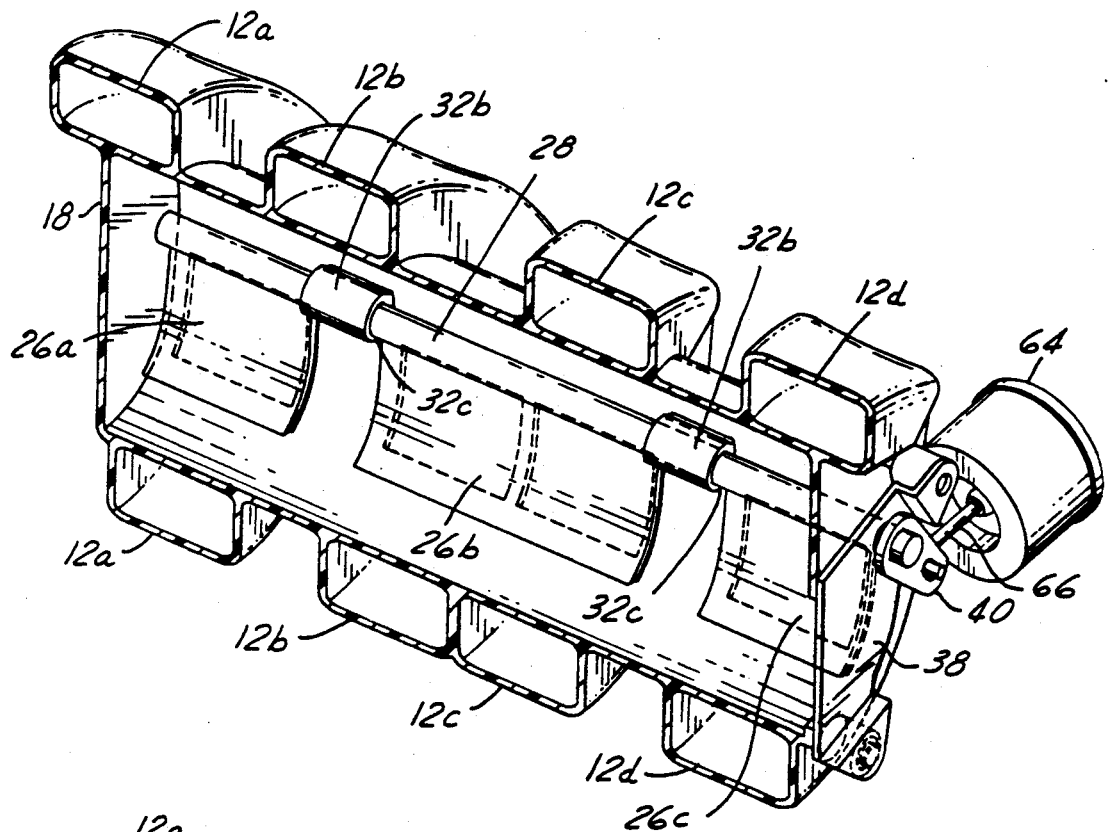
FIG. 7 is a view similar to FIG. 2 illustrating still another modified form.
Figure 8:
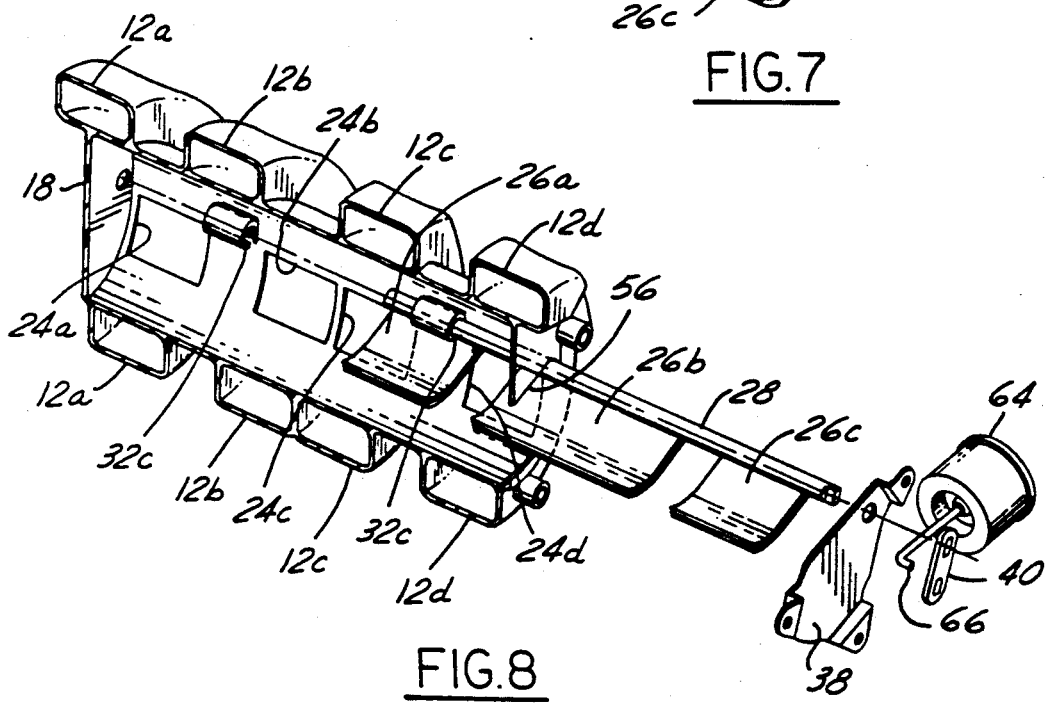
FIG. 8 is an exploded view of FIG. 7 illustrating a method.

The embodiment of FIGS. 7 and 8 comprises the use of no journal sleeve 32a or tray 32. Instead, journal sleeve structure is incorporated into the plenum's sidewall 16. This journal sleeve structure comprises two spaced apart, aligned sleeves 32b. These sleeves also contain aligned slots 32c running the full length of each to provide for passage of door 26 through the sleeves as the shaft-door unit is being inserted into the plenum, as shown in FIG. 8. When the shaft-door unit is fully installed, the sleeves 32b are disposed between the respective door panels so as not to interfere with their rotary motion about the shaft axis.

In the disclosed embodiments, the plenums and runners may be fabricated from suitable plastic materials by molding techniques. Parts such as the doors, shafts, sleeves, clips, end closure members, and trays may also be suitable plastics. For compliance with specifications, it may be necessary to impart lubricity to the journals, and this can be done by suitable material selection, and- /or by using liners, polytetrafluoroethylene for example, between a journal and a shaft.

While a presently preferred embodiment of the invention has been illustrated and described, it should be appreciated that principles are applicable to other embodiments. While FIG. 8 is intended to represent the assembly method, it could equally well represent a disassembly method for removing the shaft-door unit, and the first two embodiments could be disassembled in like manner. The hole in end closure member 38 may form a part of the journal for the shaft and/or incorporate a seal for sealing between itself and the shaft. The end closure members could be assembled onto the plenum after the shaft-door unit, the shaft-door-tray unit, or the shaft-door-journal sleeve unit has been inserted lengthwise into the plenum.

What is claimed is:

1. An internal combustion engine intake manifold comprising a plenum from which extends at least one transverse runner to at least one combustion chamber of the engine wherein each such runner has a selectable effective length between the plenum and a corresponding combustion chamber provided by a selective opening and closing of a door between the runner and the plenum chamber, said door is disposed on a shaft, said shaft is mounted for rotary motion on said plenum about an axis, and said shaft passes from said plenum through an opening in an end wall of said plenum, characterized in that said opening in an end wall of said plenum is closed by a closure member that provides at least some journaling for the shaft.

2. An internal combustion engine intake manifold as set forth in claim 1 characterized further in that said door projects radially of said axis outwardly beyond said shaft, said door and shaft are disassemblable from the plenum as a unit and said opening in the end wall of said plenum is sized and shaped to provide for said door and shaft to be disassembled from the plenum by bodily movement lengthwise through said opening in the end wall of said plenum after said closure member has been removed from said opening in the end wall of said plenum.

3. An internal combustion engine intake manifold as set forth in claim 2 characterized further in that said door and shaft are carried by an underlying tray that is a part of said unit and disposed against an underlying wall of said plenum containing an entrance to such runner from the plenum, said tray contains a hole overlying said entrance, and said door is selectively operable to pass through said hole to open and close said entrance.

4. An internal combustion engine intake manifold as set forth in claim 3 characterized further in that said hole substantially registers with said entrance.

5. An internal combustion engine intake manifold as set forth in claim 4 characterized further in that said door comprises an integral perimeter seal for sealing against a perimeter margin of said entrance.

6. An internal combustion engine intake manifold as set forth in claim 2 characterized further in that said door and shaft are carried by a journal sleeve that is a part of said unit and provides at least some of the journaling of said shaft.

7. An internal combustion engine intake manifold comprising a plenum from which extends at least one transverse runner to at least one combustion chamber of the engine wherein each such runner has a selectable effective length between the plenum and a corresponding combustion chamber provided by a selective opening and closing of a door between the runner and the plenum chamber, said door is disposed on a shaft, said shaft is mounted for rotary motion on said plenum about an axis, characterized in that said door and shaft are carried by an underlying tray disposed against an underlying wall of said plenum containing an entrance to such runner from the plenum, said tray contains a hole overlying said entrance, and said door is selectively operable to pass through said hole to open and close said entrance.

8. An internal combustion engine intake manifold as set forth in claim 7 characterized further in that said hole substantially registers with said entrance.

9. An internal combustion engine intake manifold as set forth in claim 8 characterized further in that said door comprises an integral perimeter seal for sealing against a perimeter margin of said entrance.

10. A method of making an internal combustion engine intake manifold comprising a plenum that is laterally bounded by one or more runners from the plenum to one or more combustion chambers of the engine wherein each such runner has a selectable effective length between the plenum and a corresponding combustion chamber provided by the selective opening and closing of a door between the runner and the plenum chamber, said door is disposed on a shaft, said shaft is mounted for rotary motion on said plenum about an axis, said door projects radially of said axis outwardly beyond said shaft, and said shaft passes from said plenum through an opening in an end wall of said plenum, characterized in that said door and shaft are joined together to form a unit, said unit is inserted lengthwise into said plenum through an opening in an end wall of said plenum that is sized and shaped to allow for the passage of said unit therethrough, and said opening is thereafter closed by a closure member through which said shaft passes for connection exteriorly of said plenum to an actuator.

11. A method of making an internal combustion engine intake manifold as set forth in claim 10 characterized further in that said plenum contains journal sleeve means through which said shaft passes during insertion of said unit into said plenum, said journal sleeve means having slot means allowing said door to pass said journal means during such insertion.

12. A method of making an internal combustion engine intake manifold as set forth in claim 10 characterized further in that said closure member is a part of said unit during insertion of said unit into said plenum.

* * * * *